United States Patent [19]

Kitrell

[11] Patent Number: 4,852,971
[45] Date of Patent: Aug. 1, 1989

[54] FENDER MOUNTED VISUAL SIGNAL DEVICE FOR A BICYCLE

[76] Inventor: John V. Kitrell, 4639 Holdrege St., Lincoln, Nebr. 68503

[21] Appl. No.: 146,488

[22] Filed: Jan. 21, 1988

[51] Int. Cl.⁴ .......................... G02B 5/12; B60Q 1/26; A47F 5/00; B60R 1/02
[52] U.S. Cl. ......................................... 350/99; 116/41; 248/289.1; 248/478; 280/288.4; D10/111
[58] Field of Search ...................... 350/99, 97; 116/41, 116/53; D10/109, 111; 298/478, 477; 248/289.1, 282; 40/903; 280/289 R

[56] References Cited

U.S. PATENT DOCUMENTS

| | | | |
|---|---|---|---|
| D. 244,918 | 7/1977 | Kitrell | D10/111 |
| D. 246,444 | 11/1977 | Kitrell | D10/111 |
| 2,939,364 | 6/1960 | Doswell et al. | 248/478 |
| 4,003,630 | 1/1977 | Kirk | 350/97 |
| 4,046,397 | 9/1977 | Kitrell | 116/41 |
| 4,108,535 | 8/1978 | Slaughter | 350/99 |
| 4,113,351 | 9/1978 | Kitrell | 350/99 |
| 4,116,154 | 9/1978 | Harris | 350/97 |

FOREIGN PATENT DOCUMENTS

| | | | |
|---|---|---|---|
| 1009201 | 4/1977 | Canada | 362/72 |
| 0014986 | 9/1980 | European Pat. Off. | 350/97 |
| 2622275 | 12/1977 | Fed. Rep. of Germany | 350/99 |
| 1237231 | 6/1970 | France | 248/289.3 |
| 99358 | 12/1961 | Norway | 350/99 |
| 936465 | 9/1963 | United Kingdom | 350/99 |

Primary Examiner—Bruce Y. Arnold
Assistant Examiner—Ronald M. Kachmarik
Attorney, Agent, or Firm—Zarley, McKee, Thomte, Voorhees & Sease

[57] ABSTRACT

A fender mounted visual signal device for a bicycle comprising a base portion which is mounted on the fender and having an upstanding channel-shaped support member selectively rotatably mounted thereon. One side of the support member has a light reflective surface provided thereon with the other side of the support member having a highly visible day glow orange material positioned thereon. A plurality of flat members are pivotally connected at their lower ends to the support member and may be pivotally moved from a stored position to an operative position.

3 Claims, 4 Drawing Sheets

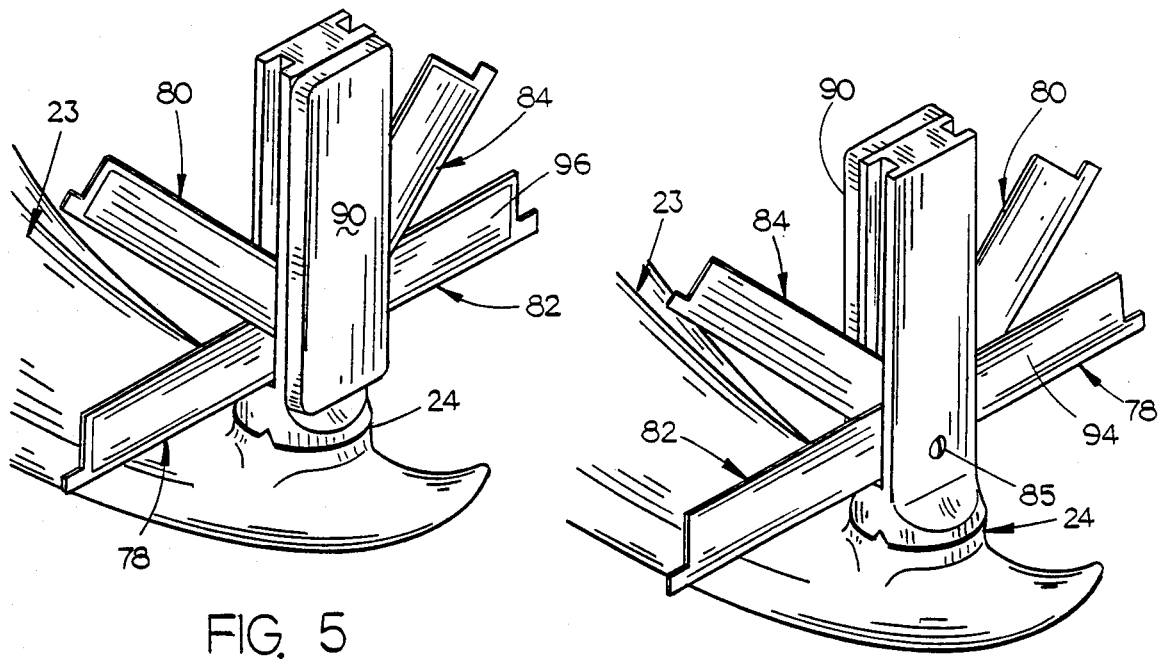
FIG. 5
FIG. 6
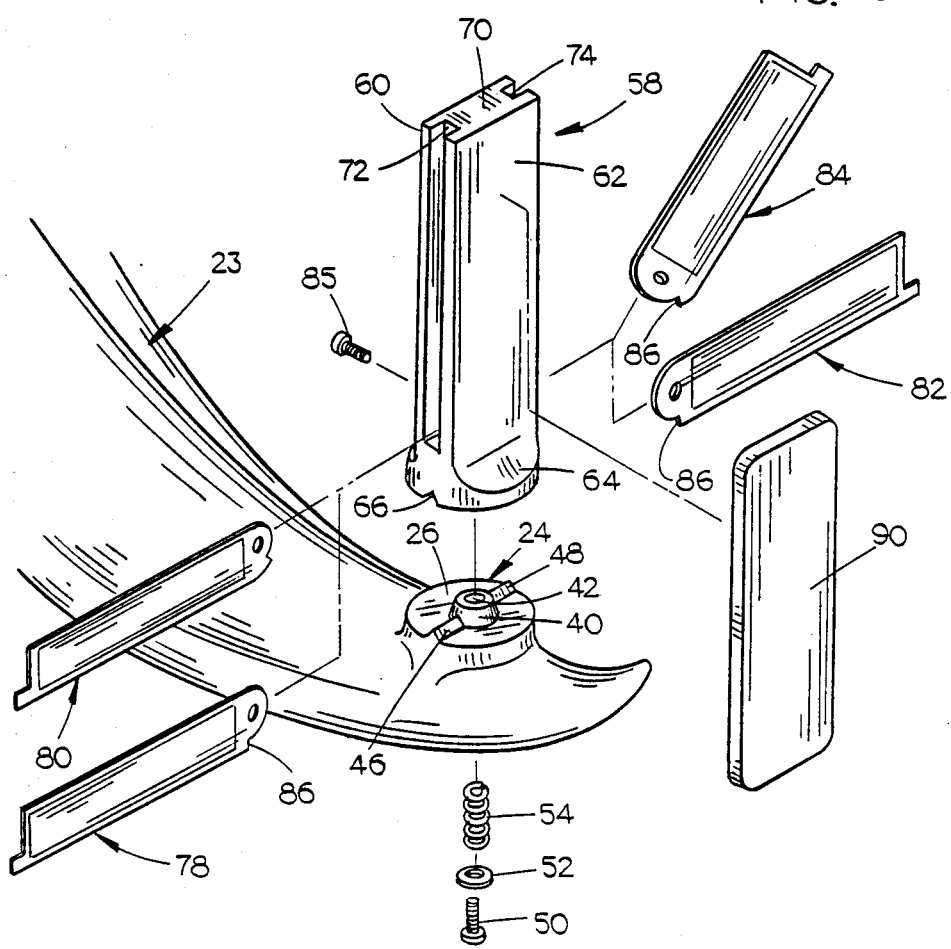
FIG. 7

FENDER MOUNTED VISUAL SIGNAL DEVICE FOR A BICYCLE

BACKGROUND OF THE INVENTION

This invention relates to a visual signal device for a bicycle, and more particularly to a fender mounted two-sided device which has a light reflective means on one side and which has a "day glow orange" material on the other side thereof. The signal device is selectively rotatable to permit either the light reflective means or the day glow orange material to be presented rearwardly.

Heretofore, various types and sizes of reflective materials have been assembled into devices to provide protection during darkness for objects to which they are attached when these objects are subjected to a light source from approaching vehicles. When such prior devices have been used previously, the mass described by the reflected light, when viewed from a distance, has been on a one-to-one ratio with the area of the reflective material presented by the devices. Thus, the prior devices presented a continuous source of compromise between desired adequate illumination and practicality of such a device from the standpoint of cost, size, appearance in daylight, and general consumer acceptability.

The above-described difficulties were solved, for the most part, by applicant's earlier U.S. Pat. Nos. 4,046,397 and 4,113,351. In particular, the instant invention is deemed to be an improvement of the device disclosed in U.S. Pat. No. 4,046,397. In the device of the U.S. Pat. No. 4,046,397, a plurality of flat rectangular shaped reflector members were pivotally mounted within an elongated, upstanding channel-shaped support with the reflector members being selectively pivotally moveable with respect to the support to present a generally fan-shaped outline.

In the application U.S. Pat. No. 146,302 entitled "Visual Signal Device for a Bicycle" filed concurrently herewith, a device is described which has the ability to be able to be rotated so that a light reflective surface may be presented in the desired direction at night and so that a highly visible day glow orange surface will be presented during the daylight hours. The device of the co-pending application is designed to be mounted on either the front fork or the rear fork of the bicycle. In some instances, the bicycle upon which the signal device is to be mounted does not have a rear fender and it has been found that it is desirable, in some cases, to not only provide a visual signal device for the bicycle but to mount the same on a fender which may be secured to the rear fork of the bicycle.

It is therefore a principal object of the invention to provide an improved safety reflector device.

A further object of the invention is to provide a fender mounted improved safety reflector device.

Still another object of the invention is to provide a device of the type described which may be selectively rotatably moved to present either a light reflective surface or a highly visible day glow orange surface.

These and other objects will be apparent to those skilled in the art.

BRIEF DESCRIPTION OF THE DRAWINGS

FIG. 5 is a rear perspective view of a portion of the device;

FIG. 6 is a view similar to FIG. 5 except that the device has been rotated to display the day glow orange material rearwardly;

FIG. 7 is an exploded perspective view of a portion of the device; and

SUMMARY OF THE INVENTION

Figure 1:
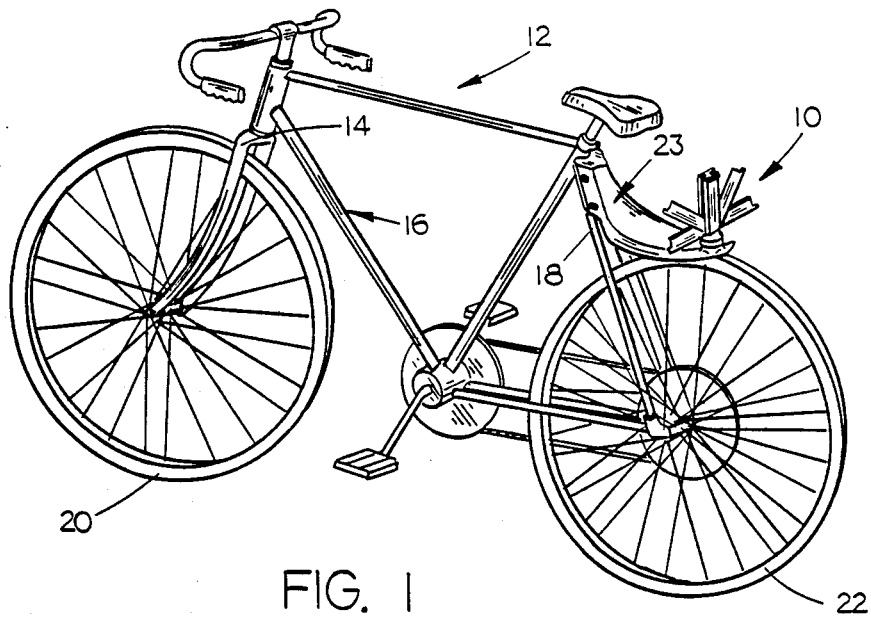
FIG. 1 is a rear perspective view of a bicycle having the device of this invention mounted thereon.
Figure 2:
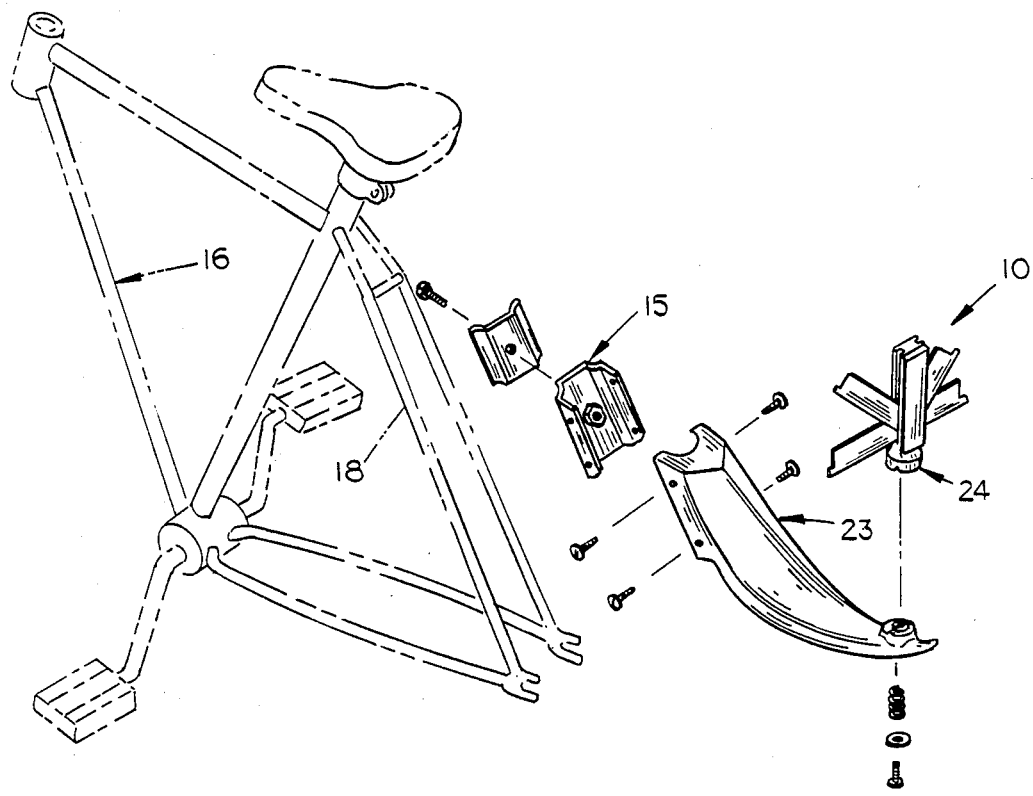
FIG. 2 is an exploded perspective view of the device of this invention with the broken lines indicating the frame of the bicycle.
Figure 3:
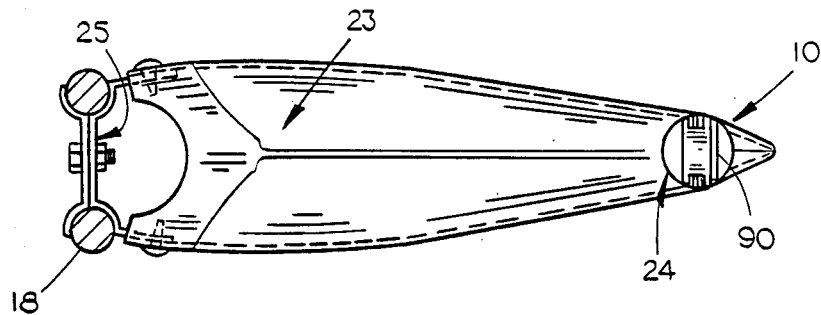
FIG. 3 is a top elevational view of the device.
Figure 4:
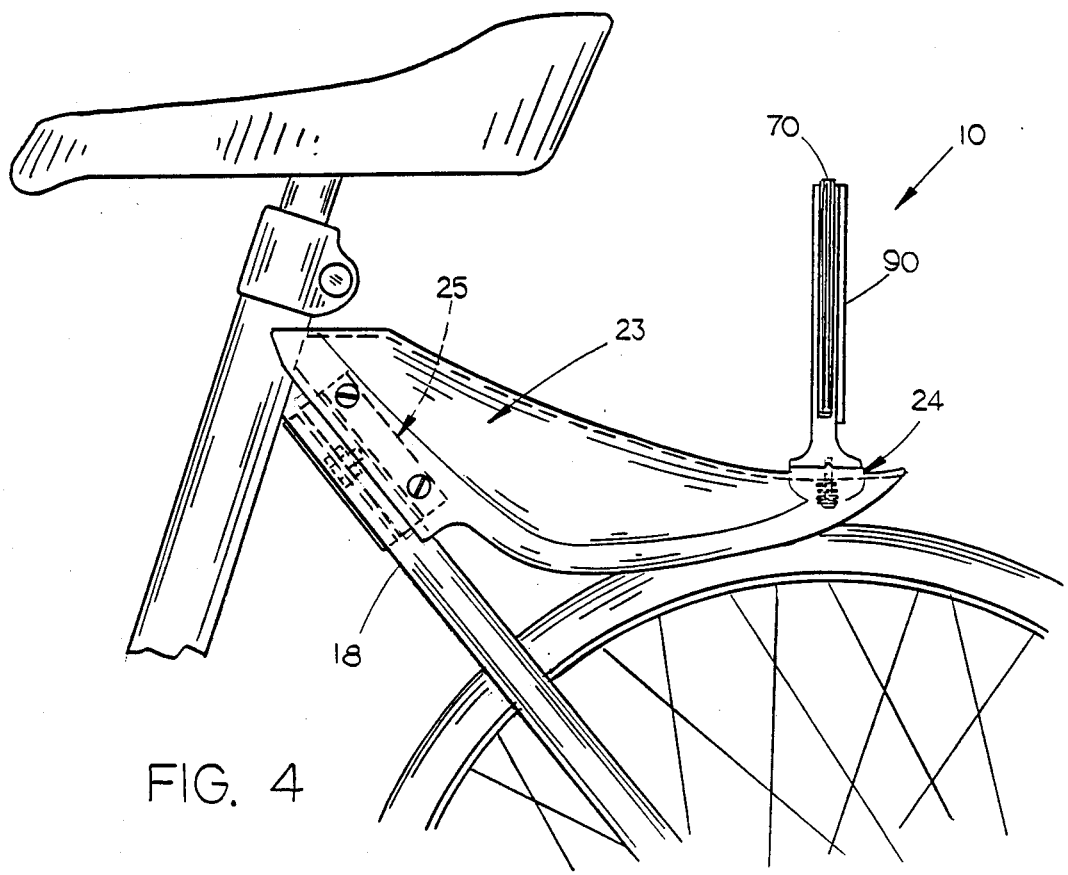
FIG. 4 is a side elevational view of the device.
Figure 8:
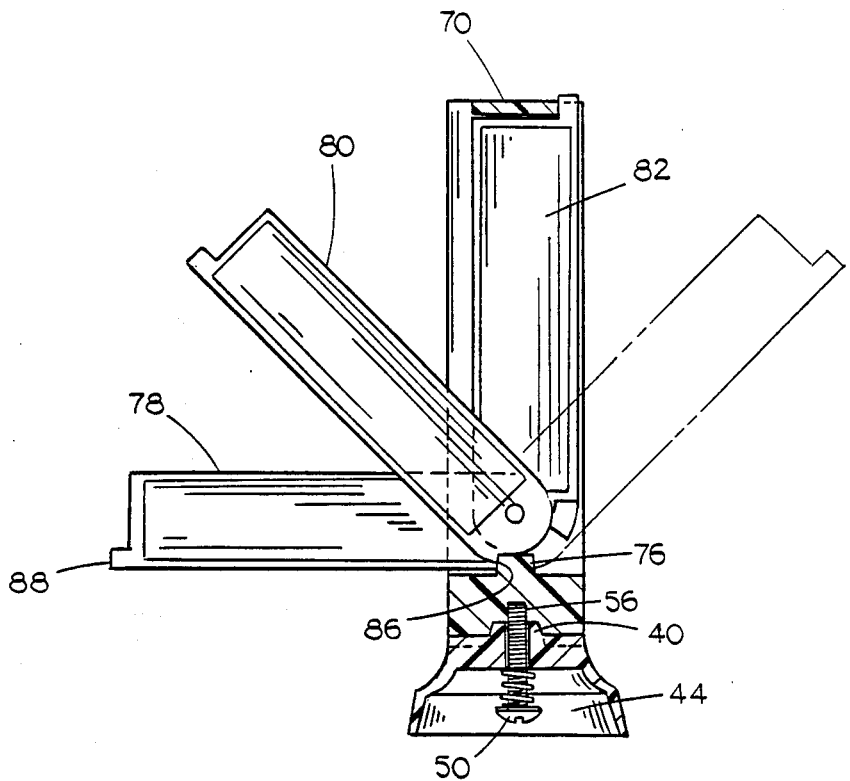
FIG. 8 is a vertical sectional view of a portion of the device.

The visual signal device of this invention is mounted on a fender which is secured to the rear fork of the bicycle. The device includes a base portion which is mounted on the fender. An upstanding channel-shaped support member is selectively rotatably mounted on the base portion and has a light reflective surface provided on one side thereof and a highly visible day glow orange material on its other side.

A plurality of flat members or segments are pivotally connected at their lower ends to the channel-shaped support member and may be pivotally moved from a stored position to an operative position. One side of each of the flat members has a light reflective surface thereon while the other side of each of the flat members is provided with a day glow orange material thereon. In the stored position, the flat members are received between the side walls of the channel-shaped support member. The flat members may be pivotally moved with respect to the channel-shaped support member and are automatically positioned in a fan-shaped configuration when the flat members are pivotally moved to their operative position. The channel-shaped support member may be selectively rotated with respect to the base portion to present either the day glow orange material or the light reflective material when viewed from the rear of the bicycle.

DESCRIPTION OF THE PREFERRED EMBODIMENT

The numeral 10 refers generally to the visual signal device of this invention adapted to be mounted on a bicycle including a front fork 14, frame 16 and rear fork 18. Front wheel 20 is conventionally mounted in front fork 14 while rear wheel 22 is conventionally mounted in rear fork 18.

Device 10 includes an arcuate fender 23 which is secured to the rear fork 18 by clamp means 25 and which extends rearwardly over the rear wheel 22 as seen in the drawings. Extending upwardly from fender 23 is a base portion 24 having an upper surface 26.

Base portion 24 is provided with an upwardly extending cylindrical boss 40 having opening 42 extending downwardly therethrough which communicates with recess 44. A pair of oppositely extending V-shaped stops 46 and 48 extend laterally from boss 40 as seen in the drawings.

Bolt 50 is positioned in recess 44 and extends upwardly through opening 42 as seen in the drawings. Washer 52 and spring 54 are mounted on bolt 50 below opening 42. The upper end of bolt 50 is threadably received in threaded opening 56 which is formed in the bottom portion of an upstanding channel-shaped support member 58. For purposes of description, support member 58 will be described as having oppositely disposed walls 60 and 62 which extend upwardly from base 64. Base 64 is provided with a pair of V-shaped grooves 66 and 68 formed in the bottom surface thereof which are adapted to receive the stops 46 and 48 as will be described hereinafter. Top wall 70 extends between the upper ends of walls 60 and 62 and is provided with notches 72 and 74 formed therein. Support member 58 is provided with a centrally disposed stop 76 which extends upwardly from base 64 between walls 60 and 62.

The numerals 78, 80, 82 and 84 refer to flat rectangular-shaped members as segments which are pivotally connected at their lower ends to support member 58 by screws 85. The lower ends of members 78, 80, 82 and 84 are provided with stops 86 formed thereon which are adapted to engage stop 76 so that the outward pivotal movement thereof is limited thereby. The stops 86 on members 78 and 80 are different or offset from one another so that the members 78 and 80 will be automatically positioned in the fan-shaped configuration seen in the drawings. Similarly, the stops 86 on members 82 and 84 are offset from each other, but are identical to stops 86 on members 78 and 80 respectively, so that the stops 86 on members 82 and 84 will engage stop 76 to also position the members 82 and 84 in the fan-shaped configuration. Each of the members 78, 80, 82 and 84 are provided with an upwardly extending shoulder 88 which is provided to assist in moving the members 78, 80, 82 and 84 to the fan-shaped position. The inner ends of shoulders 88 are also designed to engage the inner ends of the notches 72 and 74 as seen in the drawings to limit the inward movement of the members relative to the support member 58.

Wall 62 is provided with a typical light reflective surface thereon such as a prism lens 90 while wall 62 is provided with a typical day visibility material such as a day glow orange material. For purposes of description, the day glow orange material will be referred to by the reference numeral 92. Each of the members 78, 80, 82 and 84 are provided with the same day glow orange material at one side thereof which is referred to generally by the reference numeral 94. The other sides of the member 78, 80, 82 and 84 are provided with a conventional light reflective surface or material thereon referred to generally by the reference numeral 96.

If only a single light reflective surface is desired to be displayed rearwardly of the bike, support member 58 would be positioned on base portion 24 so that the reflective lens 90 faces rearwardly. If it is desired to create additional light reflective surfaces, the members 78, 80, 82 and 84 are pivotally moved outwardly into the fan-shaped position as seen in FIG. 5. If the device is being used in daylight hours, support member 58 is rotated relative to base portion 24 so that the surface 92 is presented or faces rearwardly. The members 78, 80, 82 and 84 may be pivotally moved outwardly to the fan-shaped configuration as desired to present a larger visual signal area as seen in FIG. 6. Support member 58 is held at either of the positions described due to the spring action of spring 54 which yieldably urges support member 58 downwardly relative to base portion 24 with the members 46 and 48 receiving the notches 66 and 68 respectively, or the notches 68 and 66 respectively.

As in applicant's earlier U.S. Pat. No. 4,046,397, the device is positioned so that the light reflective surfaces are facing rearwardly, and the device is in the fan-shaped configuration, the device will present a large reflective mass when viewed from a distance but will become a highly distinguishable object as the light source approaches the device. While it has been described that four of the reflective members, 78, 80, 82 and 84 are utilized, it should be noted that any desired number may be used.

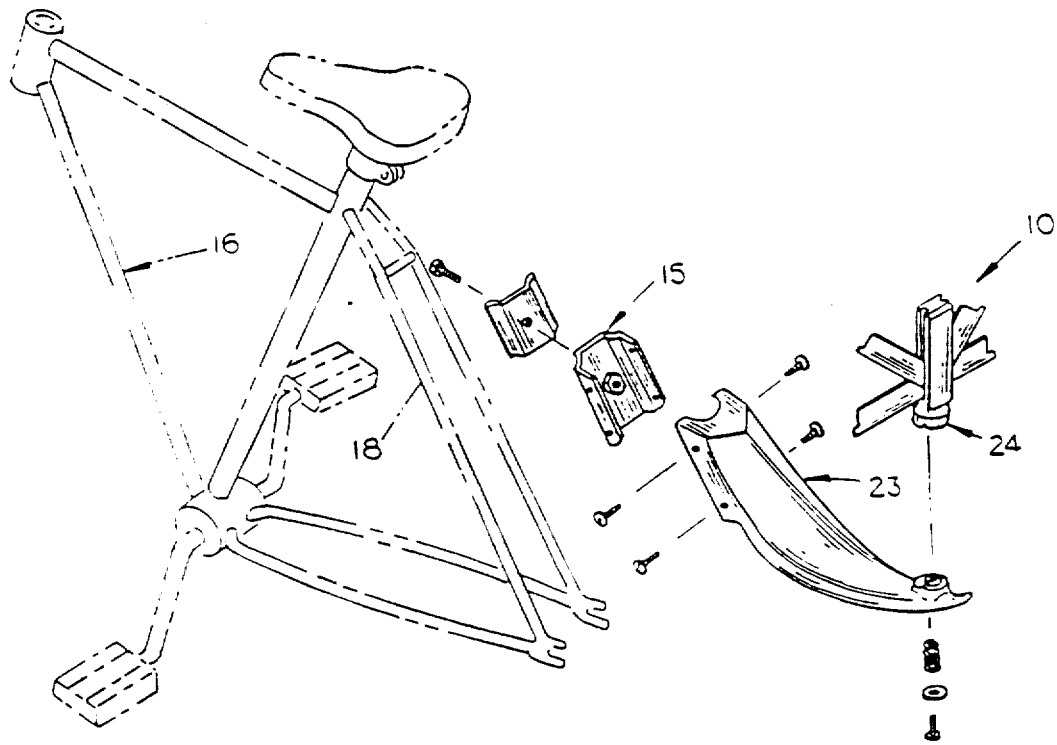

I claim:

1. A visual signal device for a bicycle, comprising,
   a arcuate fender means having rearward and forward ends,
   means for securing the forward end of the fender means to the rear of the bicycle,
   an upstanding support member selectively rotatably mounted, between first and second positions, on said fender means and extending upwardly therefrom,
   said support member having spaced-apart opposite front and back sides and opposing right and left sides,
   one of said front and back sides of said support member having a light reflective surface provided thereon,
   the other of said front and back sides of said support member having a material provided thereon which is highly visible during daylight hours, and
   at least a first and second flat, substantially rectangular member having upper and lower ends and opposite sides, each of said members being selectively pivotally secured at the lower end thereof to said upstanding support member,
   said rectangular members having a light reflective surface on one side thereof,
   said rectangular members having material on the other side thereof which is highly visible during daylight hours,
   said first rectangular member being selectively pivotally movable from a super-imposed stored position in said support member to an operative position, pivoted to the left, outwardly from said support member,
   said second rectangular member being selectively pivotally movable from a super-imposed stored position in said support member to an operative position, pivoted to the right, outwardly from said support member,
   said rectangular members having substantially their entire lengths spaced from each other and said support member, when in said operative position so as to form a fan-shape,
   and means selectively rotatably mounting said support member to said fender means whereby either the light reflective surfaces or the highly visible material faces rearwardly.

2. The device of claim 1 further comprising:
   third and fourth flat, substantially rectangular members having upper and lower ends and opposite sides, each of said members being selectively pivotally secured at the lower end thereof to said upstanding support member,
   said third and fourth rectangular members having a light reflective surface on one side thereof,
   said third and fourth rectangular members having material on the other side thereof which is highly visible during daylight hours,
   said third rectangular member being selectively pivotally movable from a super-imposed stored position in said support member to an operative position, pivoted to the left, outwardly from said support member, said fourth rectangular member being selectively pivotally movable from a super-imposed stored position in said support member to an operative position, pivoted to the right, outwardly from said support member, said third rectangular member having substantially its entire length spaced from said first rectangular member and said support member, and generally intermediate therebetween, when in said operative position, said fourth rectangular member having substantially its entire length spaced from said second rectangular member and said support member, and generally intermediate therebetween, when in said operative position, said operative positions of said first and second rectangular members being substantially horizontal, perpendicular to said support member whereby said rectangular members form a fan-shape when moved to their operative positions.

3. The device of claim 2 further comprising stop means on said rectangular members to prevent pivotal movement thereof beyond their operative positions, and wherein said rectangular members are mounted on said support member so as to maintain their operative positions by force of gravity.

* * * * *

UNITED STATES PATENT AND TRADEMARK OFFICE
CERTIFICATE OF CORRECTION

PATENT NO. : 4,852, 971

DATED : August 1, 1989

INVENTOR(S) : John V. Kitrell

It is certified that error appears in the above-identified patent and that said Letters Patent is hereby corrected as shown below:

The title page showing the illustrative figure should be deleted to appear as per attached title page.

Signed and Sealed this

Fifteenth Day of May, 1990

Attest:

HARRY F. MANBECK, JR.

Attesting Officer

Commissioner of Patents and Trademarks

United States Patent [19]

Kitrell

[11] Patent Number: 4,852,971
[45] Date of Patent: Aug. 1, 1989

[54] FENDER MOUNTED VISUAL SIGNAL DEVICE FOR A BICYCLE

[76] Inventor: John V. Kitrell, 4639 Holdrege St., Lincoln, Nebr. 68503

[21] Appl. No.: 146,488

[22] Filed: Jan. 21, 1988

[51] Int. Cl.⁴ .............. G02B 5/12; B60Q 1/26; A47F 5/00; B60R 1/02
[52] U.S. Cl. .............. 350/99; 116/41; 248/289.1; 248/478; 280/288.4; D10/111
[58] Field of Search .......... 350/99, 97; 116/41, 116/53; D10/109, 111; 298/478, 477; 248/289.1, 282; 40/903; 280/289 R

[56] References Cited

U.S. PATENT DOCUMENTS

| | | | |
|---|---|---|---|
| D. 244,918 | 7/1977 | Kitrell | D10/111 |
| D. 246,444 | 11/1977 | Kitrell | D10/111 |
| 2,939,364 | 6/1960 | Doswell et al. | 248/478 |
| 4,003,630 | 1/1977 | Kirk | 350/97 |
| 4,046,397 | 9/1977 | Kitrell | 116/41 |
| 4,108,535 | 8/1978 | Slaughter | 350/99 |
| 4,113,351 | 9/1978 | Kitrell | 350/99 |
| 4,116,154 | 9/1978 | Harris | 350/97 |

FOREIGN PATENT DOCUMENTS

| | | | |
|---|---|---|---|
| 1009201 | 4/1977 | Canada | 362/72 |
| 0014986 | 9/1980 | European Pat. Off. | 350/97 |
| 2622275 | 12/1977 | Fed. Rep. of Germany | 350/99 |
| 1237231 | 6/1970 | France | 248/289.3 |
| 99358 | 12/1961 | Norway | 350/99 |
| 936465 | 9/1963 | United Kingdom | 350/99 |

*Primary Examiner*—Bruce Y. Arnold
*Assistant Examiner*—Ronald M. Kachmarik
*Attorney, Agent, or Firm*—Zarley, McKee, Thomte, Voorhees & Sease

[57] ABSTRACT

A fender mounted visual signal device for a bicycle comprising a base portion which is mounted on the fender and having an upstanding channel-shaped support member selectively rotatably mounted thereon. One side of the support member has a light reflective surface provided thereon with the other side of the support member having a highly visible day glow orange material positioned thereon. A plurality of flat members are pivotally connected at their lower ends to the support member and may be pivotally moved from a stored position to an operative position.

3 Claims, 4 Drawing Sheets